UNITED STATES PATENT OFFICE.

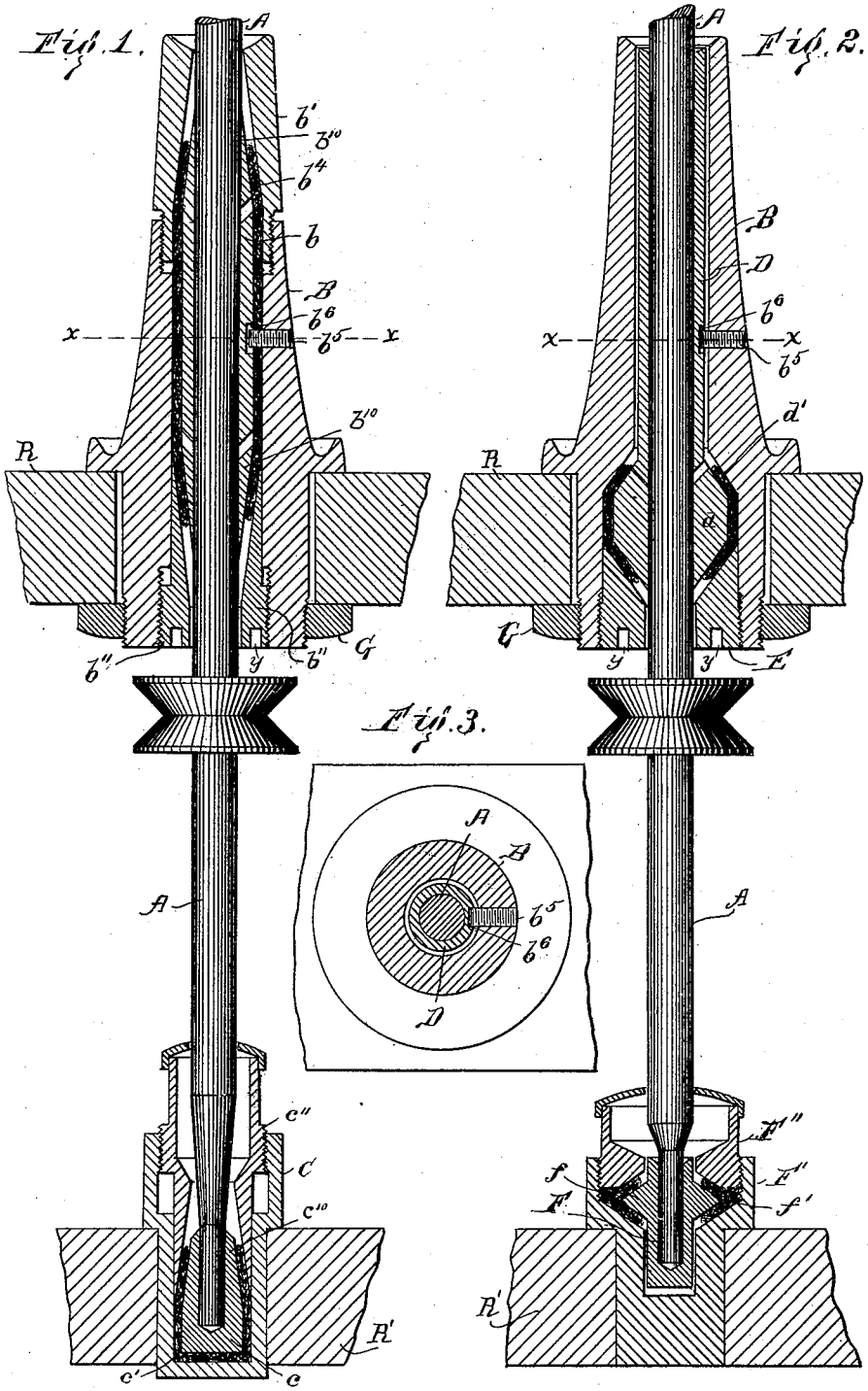

ROLLIN WHITE, OF LOWELL, ASSIGNOR TO WILLIAM F. DRAPER, OF HOPEDALE, MASSACHUSETTS.

SUPPORT FOR SPINNING-SPINDLES.

SPECIFICATION forming part of Letters Patent No. 405,233, dated June 11, 1889.

Application filed April 26, 1888. Serial No. 271,940. (No model.)

*To all whom it may concern:*

Be it known that I, ROLLIN WHITE, a citizen of the United States, residing at Lowell, in the county of Middlesex and Commonwealth of Massachusetts, have invented a certain new and useful Improvement in Supports for Spinning-Spindles, of which the following is a description.

My invention has for its object an improved construction of spindle-support, as will be hereinafter described, whereby the spindle may have a lateral and longitudinal movement in its bearings to enable it to automatically adjust itself to the changing center of gravity of the cop or bobbin, the extent of the lateral and longitudinal movement of the spindle being regulated or adjusted, as will be described, to adapt the spindle to the especial work being done.

In the accompanying drawings, Figure 1, in section, shows part of a bolster and step-rail and bolster and step bearings therein, the spindle and its whirl being shown in elevation. Fig. 2 is a similar view of a modified form of my invention; and Fig. 3 is a cross-section in the line $x$, Fig. 3.

The spindle A, of ordinary construction, takes its upper lateral bearing within a bolster-bearing $b$, contained within a supporting-case B, secured to the bolster-rail R in usual manner. The external diameter of the bolster is somewhat less than the internal diameter of the supporting-case, and between the bolster and the supporting-case I have interposed a flexible packing $b^4$, composed, it may be, of asbestus or of other suitable elastic cloth or flexible or yielding material.

The supporting-case B, as shown in Fig. 1, is threaded internally at both ends to receive screw-plugs $b'$ $b''$, the said plugs being provided at their inner ends with tapering or conical seats, or so shaped as to leave an opening, which gradually increases in diameter, so that when a plug is screwed into the supporting-case the said elastic packing $b^4$, which may extend more or less throughout the length of the bolster-bearing $b$, will be gradually compressed between the said plug and the tapering or conical end $b^{10}$ of the bolster and the inner walls of the supporting-case, such compression limiting the elasticity of the packing, and consequently the extent of motion of the spindle, the said motion being less as the plug is turned into the supporting-case, and vice versa.

Where a long section of the flexible packing is used, as in Fig. 1, it may be much more evenly compressed throughout its length by means of two plugs, one at each end of the bolster-bearing; but in the modification shown in Fig. 2 but one plug is necessary.

The lower lateral or step bearing for the spindle, (shown in Fig. 1,) may be made in any usual manner; but I prefer to construct it as shown in the drawings, in order that it may also have a lateral and also a slight longitudinal motion.

The lower bearing (shown in Fig. 1) consists of a step-casing C, which is received in a hole in the step-rail R', and in this casing is contained the step $c$, which is entered by the lower end of the spindle.

The step $c$ is somewhat smaller than the interior of the step-casing, and between the periphery of the step and the inner wall of the said casing I have interposed a flexible packing $c'$, similar to the packing $b^4$.

A plug $c''$, having a tapering or conical seat, is screwed into a screw-threaded hole in the upper end of the step-casing, and by pressing upon the flexible packing compresses it between the tapering exterior $c^{10}$ of the step $c$ and the tapering interior of the plug and the inner walls of the step-casing, thus regulating the extent of possible movement of the step in manner similar to that described of the bolster-bearing.

The contrivance shown in Fig. 2 is similar in its general construction and action to that already described, but differs slightly in detail.

In Fig. 2 the lower end of the bolster-bearing D is provided with an enlargement $d$, which is received within an enlarged recess in the lower end of the supporting-case. Between the said enlargement $d$ and the walls of the recess made in the supporting-case I have interposed a flexible packing $d'$, which is acted upon by the externally screw-threaded plug E, provided with a tapering or conical seat, as before described, whereby the flexible packing may be compressed between the said plug, the bolster, and the supporting-case.

The step F of Fig. 2 is provided with an enlargement $f$, and the step-case F' is provided below its threaded portion with a conical seat somewhat larger than the opening which receives the lower end of the step, and an externally-screw-threaded plug $F^2$, having a tapering or conical seat, is inserted in the upper part of the step-casing, and when turned down upon the flexible packing $f'$ increases its density and checks the freedom of motion of the step.

It will be noticed that the bolster-bearing does not fill the bolster-case, and that the hole in the plug used is somewhat greater in diameter than the diameter of the spindle, so that the latter is at liberty to move laterally, the extent of said movement being limited and adjusted by increasing or decreasing the density of the said flexible packing by means of the plug.

In Fig. 2 the step and bolster bearing are allowed a slight longitudinal motion, as well as a lateral motion, and this form is especially applicable to heavy spinning or twisting.

The pieces F'' c'' may be covered by a cap to exclude the dust and fiber floating in the atmosphere.

The spindle, as so far described, has, it will be noticed, two lateral bearings, one above and the other below the whirl, the lower bearing called a "step-bearing" and the upper bearing a "bolster-bearing;" and it will be noticed that these bearings have the same general construction, and that their freedom of motion is restrained by like plugs and packing, so by the term "lateral bearing," as employed in this specification, I intend to cover not only a bolster, but also a step bearing, and by the term "bearing-case" I mean either a supporting-case, such as B, or a step-case, such as C.

I claim—

1. The combination, with a vertical spindle, a bearing-case, a loose lateral bearing having a tapering exterior surface, and a yielding or flexible packing interposed between the said case and bearing, of a plug having a tapering seat to act upon and more or less compress the said packing between the tapered portions of the plug and bearing, thereby more or less limiting the freedom of motion of the bearing in the said case, substantially as described.

2. A vertical spindle, a bearing-case, a loose lateral bearing therein having a tapering exterior surface, a yielding packing interposed between the said case and bearing, and means to restrain the rotation of the said lateral bearing, combined with a plug having a tapering seat to act on the said packing and compress it to limit the extent of lateral movement of the said bearing, substantially as described.

ROLLIN WHITE.

Witnesses:
 JOHN I. COGGESHALL,
 HEBERT R. WHITE.